(12) United States Patent
Sumser et al.

(10) Patent No.: US 7,637,204 B2
(45) Date of Patent: Dec. 29, 2009

(54) BREWING DEVICE WITH TIME-SINCE-BREW INDICATOR

(75) Inventors: Dan Sumser, Lake Worth, FL (US); Tom Guyett, Boynton Beach, FL (US); Augusto Picozza, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 714 days.

(21) Appl. No.: 10/787,557

(22) Filed: Feb. 26, 2004

(65) Prior Publication Data

US 2005/0188856 A1    Sep. 1, 2005

(51) Int. Cl.
G08B 21/00 (2006.01)
G04B 27/00 (2006.01)
A47J 31/00 (2006.01)

(52) U.S. Cl. .................. 99/279; 99/323.3; 374/102; 374/141

(58) Field of Classification Search .......... 99/285, 99/275, 279, 323.3; 340/691.6, 309.15; 374/102, 374/141
See application file for complete search history.

(56) References Cited

U.S. PATENT DOCUMENTS

| 4,406,217 | A |  | 9/1983  | Oota |
| 5,001,969 | A | * | 3/1991  | Moore et al. ................. 99/282 |
| 5,193,439 | A | * | 3/1993  | Finesman et al. ............. 99/327 |
| 5,229,751 | A | * | 7/1993  | Chandler et al. ............ 340/618 |
| 5,239,519 | A | * | 8/1993  | Nelson et al. ................ 368/10 |
| 5,463,932 | A |  | 11/1995 | Olsen |
| 5,767,488 | A | * | 6/1998  | Barger et al. ................ 219/492 |
| 5,862,738 | A | * | 1/1999  | Warne ......................... 99/281 |
| D409,432  | S |  | 5/1999  | O'Keefe |
| 5,956,151 | A |  | 9/1999  | Zajac et al. |
| 6,135,010 | A | * | 10/2000 | Husted et al. ................. 99/319 |
| 6,202,540 | B1 | * | 3/2001  | Johnson et al. .............. 99/285 |
| 6,393,966 | B1 | * | 5/2002  | Hart et al. .................... 99/280 |
| 6,741,180 | B2 | * | 5/2004  | Lassota ...................... 340/622 |
| 6,752,069 | B1 | * | 6/2004  | Burke et al. ................. 99/280 |
| 6,809,301 | B1 | * | 10/2004 | McIntyre et al. ............ 219/506 |
| 7,096,776 | B2 | * | 8/2006  | Koncelik, Jr. ............... 99/285 |
| 2003/0066827 | A1 | * | 4/2003 | Daum et al. ................ 219/492 |

* cited by examiner

Primary Examiner—Reginald L Alexander
(74) Attorney, Agent, or Firm—Seth M. Blum

(57) ABSTRACT

A freshness indicator for a coffee maker having a controller is adapted to initiate the brewing of a quantity of beverage upon receiving a brewing command signal. A timer is adapted to output the time since activation of the timer upon a timer start command signal, and a display is adapted to display the output of the timer. The controller is adapted to output the timer start command signal to the timer at a predetermined time before, during or after brewing.

1 Claim, 3 Drawing Sheets

Time of day

Time-Since-Brew

BREWING DEVICE WITH TIME-SINCE-BREW INDICATOR

BACKGROUND OF THE DISCLOSURE

1. Field of the Invention

This invention relates to brewing devices, namely coffee makers, that display the time since a batch of coffee has been brewed.

2. Description of the Related Art

In the typical home or office, a pot of coffee may stand for hours before anyone brews a fresh pot. During that time, heat and oxidation degrade the aromatic coffee into an ever thickening bitter concoction. A coffee drinker, not noticing the pot is stale, may pour a cup of coffee only to find that it is stale and undrinkable. This problem could be avoided if it were known how long the coffee was standing so that a new brew could be prepared and fresh coffee kept available.

A solution to this problem is described in Zajac et al., U.S. Pat. No. 5,956,151, for a BEVERAGE FRESHNESS MONITOR, issued Sep. 21, 1999, in which it is disclosed that fresh coffee is transmissible to light, but as the coffee becomes stale, the organic compounds degrade and the brew becomes less transmissible to the light. To monitor coffee freshness, Zajac passes a beam of light through a transparent coffee pot and the transmissibility of the brew is displayed as a measure of freshness. This appears to be a complex solution.

BRIEF SUMMARY OF THE DISCLOSURE

The present invention is directed to a freshness indicator for a coffee maker having a controller adapted to initiate the brewing of a quantity of beverage upon receiving a brewing command signal, a timer adapted to output the time since activation of the timer upon a timer start command signal, and a display adapted to display the output of the timer. The controller is adapted to output the timer start command signal to the timer at a predetermined time during brewing.

In another aspect of the invention, the controller outputs the timer start command signal substantially upon receipt of the brewing command signal.

In another aspect of the invention, the controller outputs the timer start command signal substantially upon receipt of a brewing completion signal indicating that brewing is complete.

In another aspect of the invention, the controller is adapted to shut off a warming plate when the timer reaches a predetermined value.

In another aspect of the invention, the display screen has graphical capability and may include liquid crystal display (LCD), light emitting diode (LED) and plasma displays.

In another aspect of the invention, the display is a display screen and has a resolution of at least 200 pixels per inch.

In another aspect of the invention, the display screen is a liquid crystal display.

In another aspect of the invention, the output of the timer is displayed on the display screen as an analog time-since-brew display.

In another aspect of the invention, the time-since-brew display indicates the output of the timer by the addition of graphical time segments, each indicating the passage of a predetermined period of time.

The present invention is further directed to a method of indicating freshness of a brewed beverage by providing a device for brewing a beverage, initiating a timer during a brewing operation, and displaying the output of the timer to the user.

The freshness indicator has a controller for initiating the brewing of a quantity of beverage upon receiving a brewing command signal, a timer for outputting the time since activation of the timer upon a timer start command signal, and display means for displaying the output of the timer. The controller is adapted to output the timer start command signal to the timer at a predetermined time during brewing or at a predetermined time associated with brewing such as at the start or completion of brewing, or shortly before or after brewing.

DETAILED DESCRIPTION OF THE PREFERRED EMBODIMENTS

Figure 1:
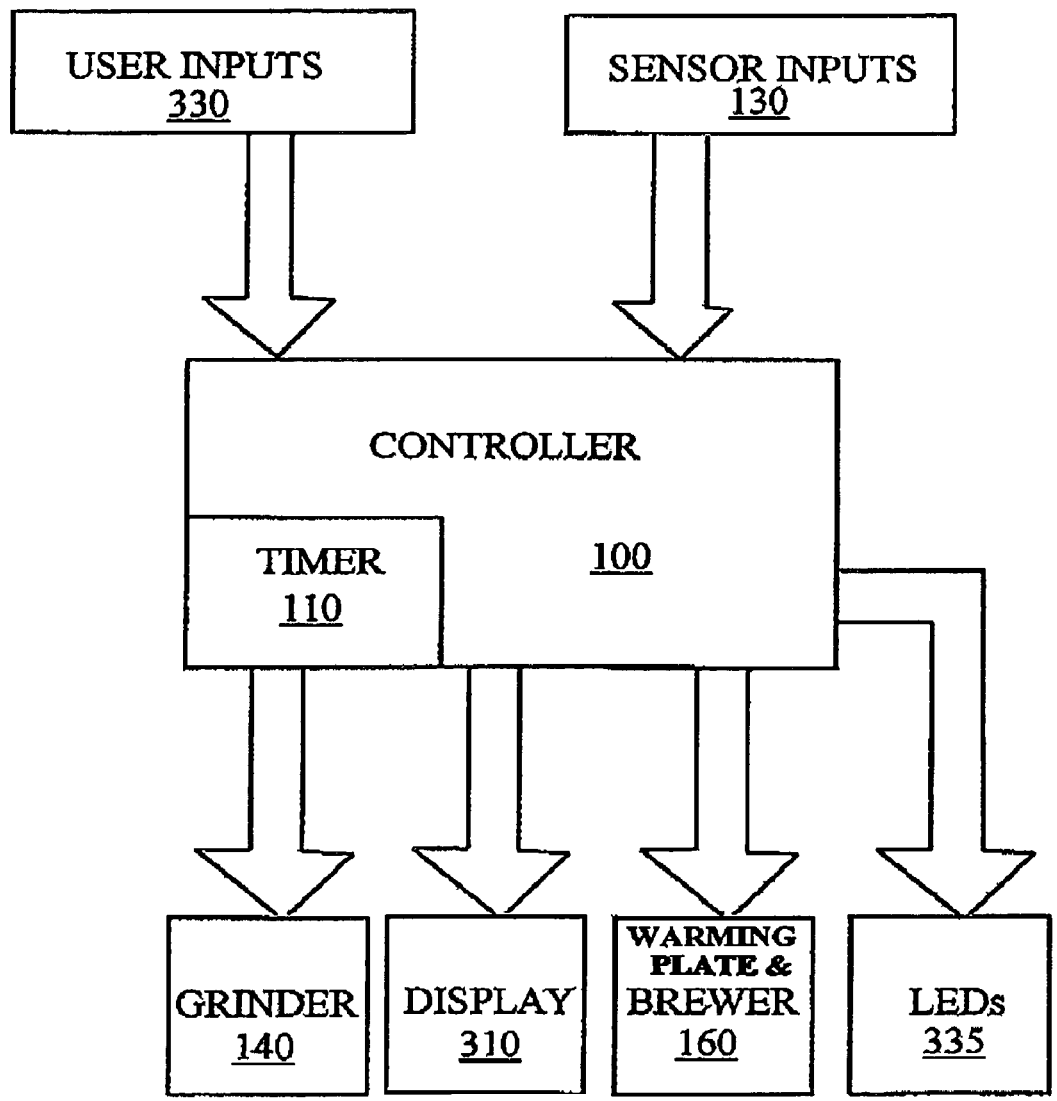
FIG. 1 shows a schematic of an embodiment of the invention.

FIG. 1 schematically represents a control system for a coffee maker constructed in accordance with the invention. A controller 100 is preferably provided in the form of a microprocessor supplied with memory. A timer 110, which may be external to the controller, is shown here as integral to the controller. The timer 100 is in data communication with the controller 100 so as to be adapted to rest to zero and start upon receipt of a timer start command signal from the controller 100 and to stop upon receipt of a timer stop command signal from the controller 100.

The controller 100 is in data communication with user inputs 330, which derive from user controls on the coffee maker. The controller 100 is also in data communication with sensor inputs 130, which may include the temperature of an evaporation chamber in which water is boiled for brewing and the temperature of a warming plate upon which a coffee pot sits, as well as any other physical data a designer may desire for the various operations of the coffee maker.

The controller 100 is in data communication with various devices that effect the operation of the coffee maker, such as the controllable components of a coffee grinding system 140 and the controllable components of the brewing system 160, so as to be able to control them with command signals. The controllable components of the brewing system can be no more than the separate heating elements in the evaporation chamber and the warming plate.

The controller 100 will also be in data communication with a display 310, such that the time registered by the timer 110 may be displayed thereon. Display 310 can take the form of a LED, LCD, plasma display or any other suitable display. Also, the controller 100 may command the display to display other data, such as the current date and time, or system status, upon its own initiative or upon a user command. The controller 100 may read timer data from the timer 110 and transfer it to the display or may simply shut on and off a direct transfer of timer data from the timer 110 to the display 310. As will be explained with respect to FIG. 4, this timer will be used to provide the time-since-brew.

The controller will preferably also be in command of one or more indicator LEDs 335 as will be described with respect to FIG. 2.

Figure 2:
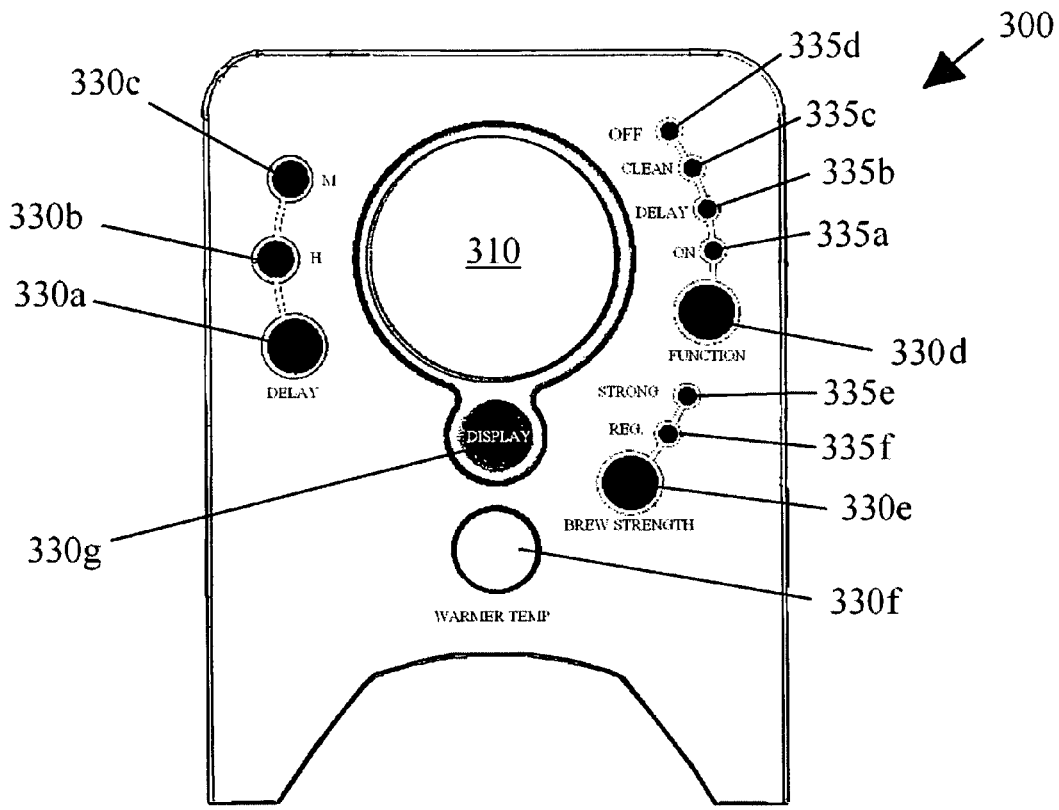
FIG. 2 is a front elevation view of a control panel that may be used with the invention.

FIG. 2 shows one example of a control panel design for the coffee maker. The arrangement of the controls on the panel is purely a matter of choice. The panel includes a number of user controls 330, a display screen 310 and a plurality of indicator LEDs 335. The type of controls and indicator LEDs will depend on what features the coffee maker has. What is necessary to the invention is the display 310 and a controller to initiate and terminate brewing.

The display is preferably a display screen 310 having medium to high resolution graphical capability, generally at least 200 pixels per inch, preferably at least 300 pixels per inch. A LCD is preferred for its compactness, quality of image, and commercial availability. Good graphical capability is desirable because it allows for simulating analog devices, as will be explained wit respect to FIG. 3. Alternatively, costs may be reduced by foregoing a display screen and using a simple numeric LED display.

Typical controls include a delay button 330a with hour 330b and minute 330c buttons to allow the user to set the coffee maker to begin brewing at a specific time. A function button 330d may be provided that allows the user to either place the coffee maker in an "ON" mode to begin brewing immediately, a "DELAY" mode to have the coffee maker activate control 330a, a "CLEAN" mode to go through a process of cleaning out the evaporation chamber with vinegar, and an "OFF" mode to shut off the warming plate and the brewer apparatus as well if the coffee maker is in the middle of a brew. The function button 330d operates by cycling the coffee maker through these modes, incrementing to the next mode each time the function button 330d is pressed. LEDs 335a through 335d are activated in turn to indicate which function is currently selected, from ON to OFF, respectively.

Other options include a brew strength control 330e so the user may select either a regular or a strong brew, a warmer plate temperature control knob 330f, and a display control 330g that the user can use to cycle through the available displays, which might include, other than time-since-brew, the current date and time and various system parameters, such as warmer plate temperature. A power switch is not shown because it is not desirable to locate a power switch on a control panel where the user might mistakenly shut off the machine while in use. Instead the power switch is generally located away from the control panel.

Figure 3A:
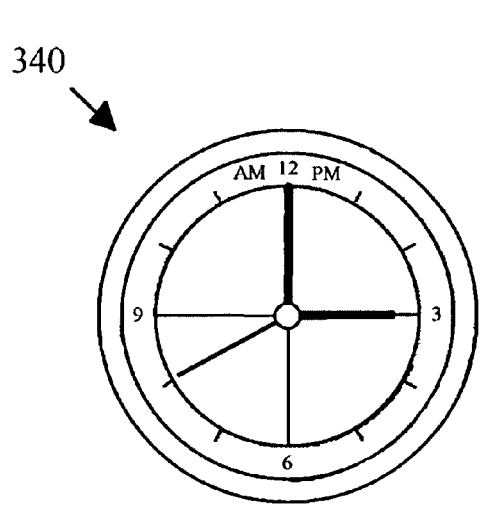
FIGS. 3a and 3b are front elevation views of preferred embodiments for time and time-since-brew displays adapted for use with the invention.
Figure 3B:
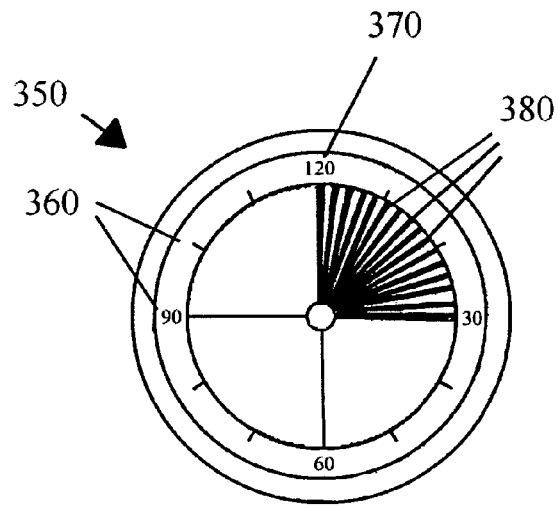

FIGS. 3a and 3b depict typical graphical displays that may be provided on the display screen 310. A simulated analog clock 340 is shown in FIG. 3a, which shows the current time of day. Preferably, as shown, the graphics of the clock would be such as to give the illusion of 3-dimensions, thereby giving the user the "feel and comfort" that analog devices are so much better at providing than digital devices.

Referring to FIG. 3b, there is shown a preferred embodiment of the time-since-brew display 350. There are provided a plurality of gradations 360 indicating time in minutes. In the preferred embodiment, the maximum warming time 370 will be at the top of this dial, but this is purely optional. In the preferred embodiment of the invention, the plate warmer will shut down upon reaching the maximum warming time, as will be more fully explained with respect to FIG. 4. Also provided are graphical time segments 380 that illuminate or activate to indicate the elapsed time. In the embodiment shown, an additional segment appears every two minutes. In FIG. 3b it can be seen that thirty minutes has elapsed since brewing.

Of course, FIG. 3b could be replaced with any number of creative designs, even a typical stopwatch design with hour and minute hands, but a reason a stopwatch or other clock-like design with a sweep hands is not preferred is because of the concern that the consumer might confuse such a display with the clock display of FIG. 3a. By making the displays plainly distinct from one another, the users know immediately what information they are looking at.

Figure 4:
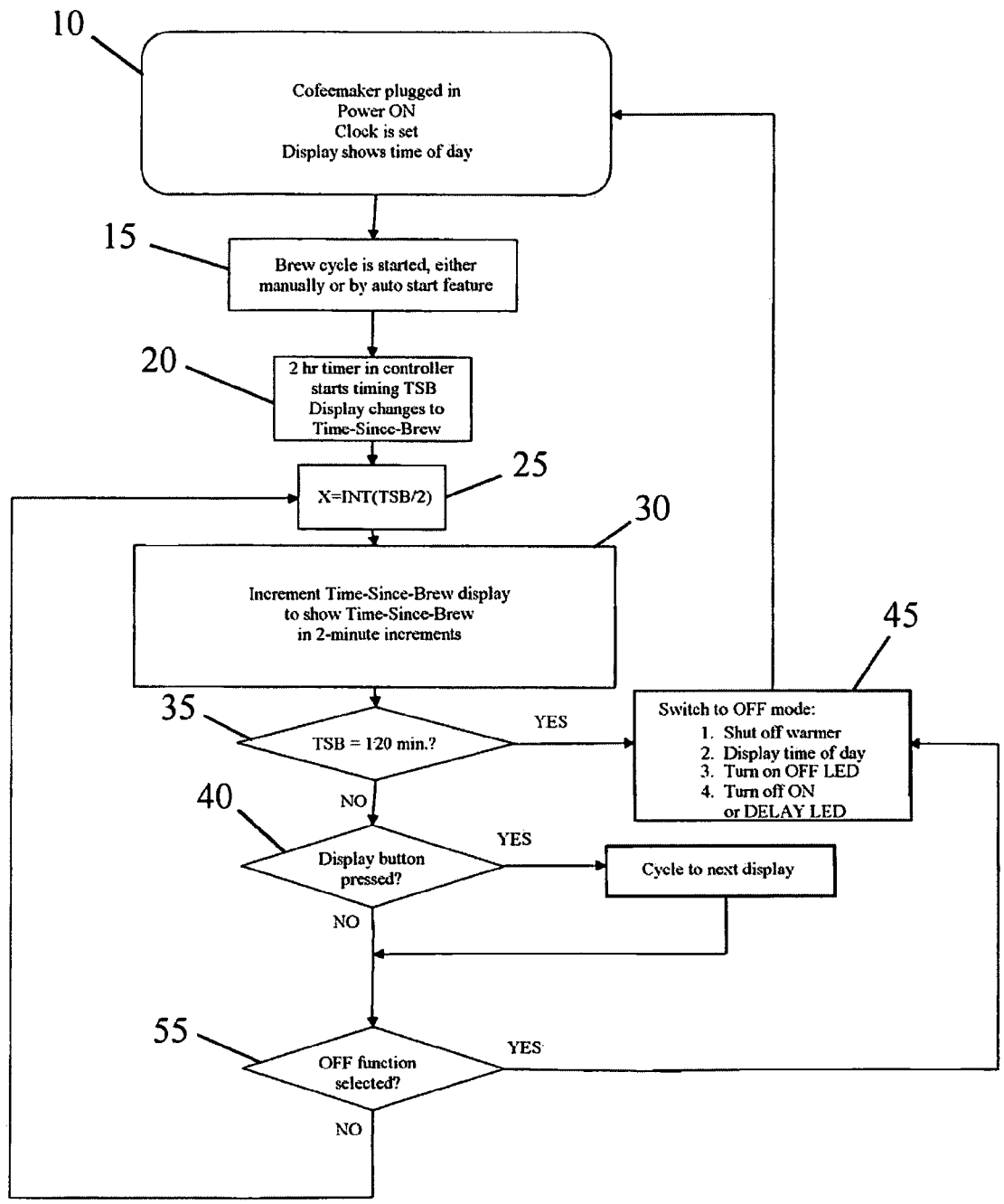
FIG. 4 is a logic flow chart of an embodiment of the invention.

Referring to FIG. 4, there is shown a preferred embodiment of the logic and functioning of the invention. Beginning at node 10, the coffee maker is plugged in, the power switch is turned on, the clock is set for the correct time and the display screen 310 is showing the current time of day. Control now flows to node 15 where the controller has received a brewing command signal, either because the user has manually initiated brewing or because the delay feature has auto-started brewing upon the time preset by the user. The controller issues the necessary brewing control signals to the brewing apparatus 160.

Control now flows to node 20 where the controller issues a timer start command signal, causing the timer to start timing the time-since-brew. The controller also issues the necessary display command signals to cause the display screen 310 to show the time-since-brew display 350.

In an alternative embodiment, the controller could start the time-since-brew timer after brewing is completed or at any other desired time referenced to some point in time before, during or after brewing is completed. The completion of brewing can be signaled by the shutdown of the water heating chamber heating element, which may itself be controlled by the controller 100 when a sensor detects that the evaporation chamber temperature substantially exceeds the boiling point of water, thereby indicating that no water remains to be evaporated, and sends a brewing completion signal to the controller.

Control now flows to nodes 25 and 30 where the time-since-brew is divided by two, rounded down to the nearest integer, and displayed on the time-since-brew display 350 by graphically displaying integer X time segments 380. This is purely optional. For the graphic display shown in FIG. 3b provided on a screen small enough to fit on a coffee maker control panel, there may not be enough display screen resolution to display a time segment every minute and get the graphic effect as shown.

Control now flows to decision node 35 where the system tests for whether 120 minutes has elapsed. If so, control flows to node 45 where the system goes into OFF mode, which simply means that the controller issues a shutdown command such that the warming plate is shut off, either the ON indicator LED 335a or the DELAY indicator LED 335b goes off (depending on which mode initiated the brewing), the OFF indicator LED 335d goes on, and the display screen 310 shows the clock display 340 again. The choice of 120 minutes is purely arbitrary and based on the observation that coffee more than two hours old is generally of poor quality. There are those who don't mind coffee much older than that, so this is a matter of design choice.

It is not necessary to have such an automatic shut off feature, as one could skip this procedure altogether and allow the warming of the coffee to go on indefinitely, thereby allowing the user to decide when its time to clean the pot and make a fresh batch. In such case the time-since-brew display 350 would be modified to be able to show any time lapse. One way is to change the markings on the gradations so that the displayed maximum warming time 370 and other marked gradations change.

To use FIG. 3 as an example, initially the markings at every quadrant are 30, 60, 90, and 120 as shown in the drawing. When the timer reaches 120 minutes, the markings change to 150, 180, 210, and 240. This change in markings can go on indefinitely.

If at node 35 it is determined that two hours has not elapsed then control flows to decision node 40 where the system checks to see if the user might have pressed the display button 330*g*. If so, the controller 100 cycles to the next display (e.g., system parameters). If the time of day 340 and time-since-brew 350 are the only displays, then this display cycle will simply keep switching back and forth between the two each time the display button 330*g* is pressed.

Control now flows to node 55 where the controller 100 checks to see if the user has selected the OFF function. If not, control returns to node 25 and the cycle repeated. If the OFF function has been selected with the FUNCTION button 330*d*, then control flows to node 45, wherein the controller 100 shuts off the warmer, switches back to the time of day display, lights the OFF indicator LED 335*d*, and shuts off either the ON indicator LED 335*a* or the DELAY indicator LED 335*b*.

As can be seen, the use of a time-since-brew timer and display is a relatively inexpensive and effective method of alerting the user whether a new batch of coffee needs to be made. Of course, this disclosure is not limited to coffee, but is applicable to any brewed beverage, such as tea.

While various values, scalar and otherwise, may be disclosed herein, it is to be understood that these are not exact values, but rather to be interpreted as "about" such values, unless explicitly stated otherwise. Further, the use of a modifier such as "about" or "approximately" in this specification with respect to any value is not to imply that the absence of such a modifier with respect to another value indicated the latter to be exact.

Changes and modifications can be made by those skilled in the art to the embodiments as disclosed herein and such examples, illustrations, and theories are for explanatory purposes and are not intended to limit the scope of the claims. Further, the abstract of this disclosure is provided for the sole purpose of complying with the rules requiring an abstract so as to allow a searcher or other reader to quickly ascertain the subject matter of the disclosures contained herein and is submitted with the express understanding that it will not be used to interpret or to limit the scope or the meaning of the claims.

What is claimed is:

1. A method of indicating freshness of a brewed beverage, comprising the steps of:
    providing a device for brewing a beverage, said device having a warming function;
    providing a graphical display on said device;
    initiating a timer with reference to a brewing operation of said device;
    displaying the time of day on the display as an analog clock until said initiation of the timer and then displaying the output of the timer as a plurality of time indicating gradations; and
    shutting down the warming function at a predetermined time after said initiating the timer; and
    displaying the time of day on the display at the predetermined time after said initiating the timer.

* * * * *